US009294436B2

(12) United States Patent
Caron et al.

(10) Patent No.: US 9,294,436 B2
(45) Date of Patent: *Mar. 22, 2016

(54) METHOD, SYSTEM AND APPARATUS FOR VERIFYING VALIDITY OF LOCATION INFORMATION IN A PACKET-BASED NETWORK

(71) Applicant: BCE INC., Verdun (CA)

(72) Inventors: Guy Caron, St-Augustin de Desmaures (CA); Jerome Grenier, Beauport (CA); Stephane Maxime Francois Fortier, Breakeyville (CA); Martin Langlois, Saint-Jean-Chrysostome (CA); William Barry Crago, Stouffville (CA)

(73) Assignee: BCE INC., Verdon (CA)

( * ) Notice: Subject to any disclaimer, the term of this patent is extended or adjusted under 35 U.S.C. 154(b) by 108 days.

This patent is subject to a terminal disclaimer.

(21) Appl. No.: 13/903,825

(22) Filed: May 28, 2013

(65) Prior Publication Data

US 2014/0022915 A1    Jan. 23, 2014

Related U.S. Application Data

(63) Continuation of application No. 12/302,780, filed as application No. PCT/CA2006/002135 on Dec. 27, 2006, now Pat. No. 8,451,826.

(30) Foreign Application Priority Data

May 26, 2006    (CA) ..................... 2549285

(51) Int. Cl.
*H04L 12/66* (2006.01)
*H04L 29/12* (2006.01)
(Continued)

(52) U.S. Cl.
CPC ............ *H04L 61/2046* (2013.01); *H04L 12/66* (2013.01); *H04L 29/06027* (2013.01); *H04L 29/12028* (2013.01); *H04L 29/12783* (2013.01); *H04L 61/103* (2013.01); *H04L 61/2015* (2013.01); *H04L 61/35* (2013.01); *H04L 63/123* (2013.01); *H04L 65/1069* (2013.01); *H04L 65/4007* (2013.01); *H04M 3/5116* (2013.01);
(Continued)

(58) Field of Classification Search
None
See application file for complete search history.

(56) References Cited

U.S. PATENT DOCUMENTS 6,678,357 B2    1/2004 Stumer et al.
6,963,557 B2 *  11/2005 Knox .......................... 370/352

(Continued)

FOREIGN PATENT DOCUMENTS

WO    WO-2007/038380 A2    4/2007
WO    WO-2007/137390 A1    12/2007

*Primary Examiner* — Chi H Pham
*Assistant Examiner* — Soon-Dong D Hyun
(74) *Attorney, Agent, or Firm* — Sean Murray; Murray IP Consulting Inc

(57) ABSTRACT

According to embodiments of the present invention, there are provided a method, system and apparatus for determining validity of location information in a packet-switched network. A method for determining if location information associated with an endpoint in a packet-switched network is valid, the location information having been stored in a memory, comprises obtaining an access device identifier associated with an access device responsible for handling a communication session between the endpoint and the packet-switched network. The access device identifier is then compared with a last known access device identifier associated with the endpoint to enable determining if the location information is valid.

28 Claims, 7 Drawing Sheets

(51) Int. Cl.
*H04L 29/06* (2006.01)
*H04M 3/51* (2006.01)
*H04M 7/00* (2006.01)

(52) U.S. Cl.
CPC ........... *H04M 7/006* (2013.01); *H04M 2242/04* (2013.01); *H04M 2242/30* (2013.01)

(56) References Cited

U.S. PATENT DOCUMENTS

| | | | |
|---|---|---|---|
| 7,920,679 B1 * | 4/2011 | Naim et al. | 379/45 |
| 8,451,826 B2 | 5/2013 | Caron et al. | |
| 2005/0063519 A1 | 3/2005 | James | |
| 2005/0213716 A1 | 9/2005 | Zhu et al. | |
| 2006/0229059 A1 | 10/2006 | Crago et al. | |
| 2006/0245570 A1 | 11/2006 | Pfleging et al. | |
| 2006/0274725 A1 | 12/2006 | Freitag et al. | |
| 2006/0280164 A1 | 12/2006 | Dickinson et al. | |
| 2007/0070990 A1 | 3/2007 | Chong et al. | |
| 2007/0115930 A1 | 5/2007 | Reynolds et al. | |
| 2007/0220038 A1 | 9/2007 | Crago | |
| 2007/0242660 A1 | 10/2007 | Xu | |
| 2007/0298806 A1 * | 12/2007 | Venkatachalam | 455/450 |
| 2008/0013523 A1 | 1/2008 | Nambakkam | |
| 2008/0089316 A1 | 4/2008 | Reams | |
| 2008/0108374 A1 * | 5/2008 | Xiong et al. | 455/456.6 |
| 2008/0144779 A1 | 6/2008 | Ray et al. | |

* cited by examiner

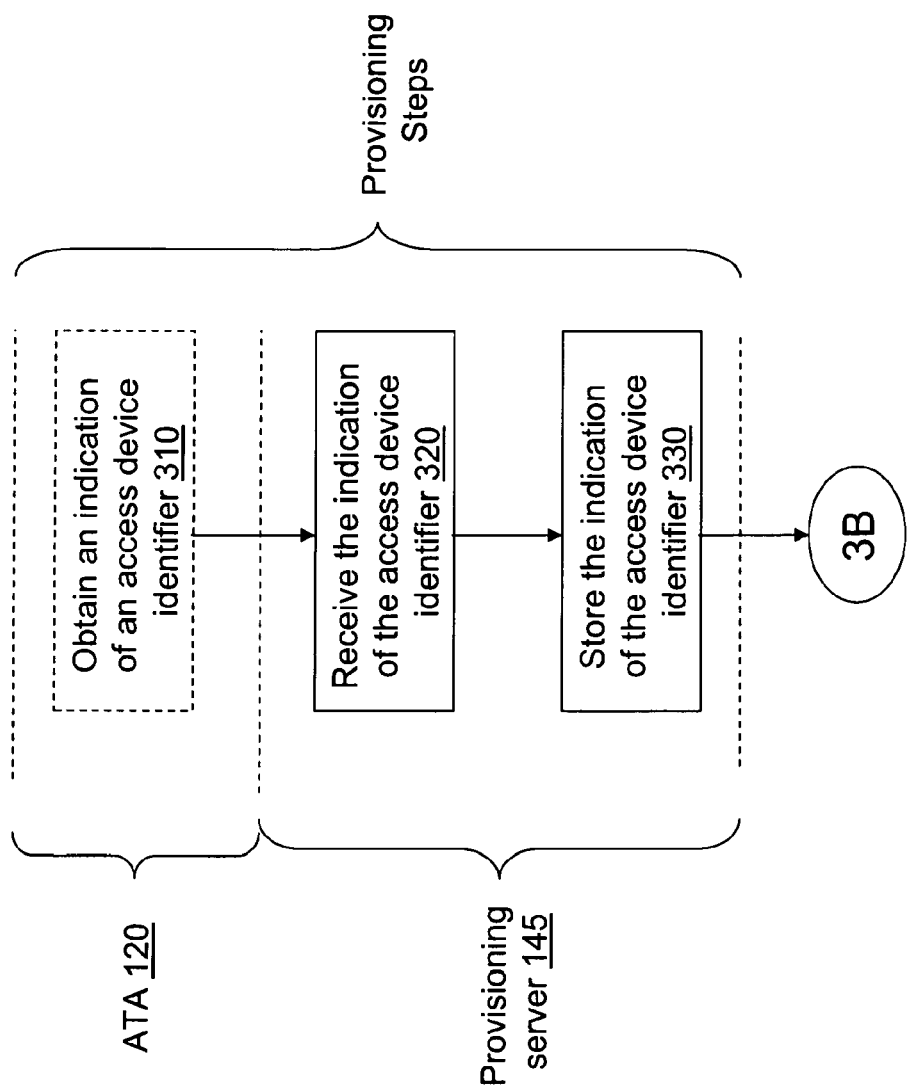

METHOD, SYSTEM AND APPARATUS FOR VERIFYING VALIDITY OF LOCATION INFORMATION IN A PACKET-BASED NETWORK

RELATED APPLICATIONS

This Application is a Continuation of U.S. patent application Ser. No. 12/302,780; filed on Nov. 26, 2008, and entitled "METHOD, SYSTEM AND APPARATUS FOR VERIFYING VALIDITY OF LOCATION INFORMATION IN A PACKET-SWITCHED NETWORK", which is a National Phase Entry of PCT Patent Application Serial No. PCT/CA2006/002135, filed on Dec. 27, 2006, and entitled "METHOD, SYSTEM AND APPARATUS FOR VERIFYING VALIDITY OF LOCATION INFORMATION IN A PACKET-SWITCHED NETWORK", which claims priority to Canadian Patent Application 2,549,285 filed on May 26, 2006.

FIELD OF THE INVENTION

This invention relates to the field of telecommunications in general and, more specifically, to a method, system and apparatus for verifying validity of location information in a packet-based network.

BACKGROUND OF THE INVENTION

With the advent of the Internet, society has witnessed the expansion of a global packet-switched network into an ever increasing number of homes and businesses. This has enabled an ever-increasing number of users to communicate with each other, primarily utilizing electronic communications such as e-mail and instant messaging. Meanwhile, advances have been made in delivering voice communication over packet-switched networks, driven primarily by the cost advantage of placing long-distance calls over the packet-switched networks, but also by the ability to deliver advanced service features to the customers. This cost advantage can be enjoyed by both a service provider delivering the voice communication over packet-switched network service (in a form of lower operating cost), as well as a customer who subscribes to the services of such a service provider (in a form of lower service subscription fees). Technology dealing with the delivery of real-time voice communication over the packet-switched network is generally referred to as voice-over-packet, voice-over-IP or VoIP.

As far as a communication endpoint in a VoIP system is concerned, several implementations have been envisioned in the industry. Some service providers have offered its customers the use of a VoIP phone that is connected directly to the packet-switched network. Even though these VoIP phones can offer a number of advanced communication features, deployment of VoIP phones obviously leads to an increased cost associated with purchase of a new VoIP phone. Other service providers have offered its customers the use of a so-called "soft phone" or, in other words, a computing apparatus equipped with software to originate and receive calls via the packet-switched network. Yet others have offered their customers the possibility to re-use their existing Plain Old Telephone System (POTS) phones by equipping them with an Analogue Telephone Adaptor (ATA) which essentially mediates communication between the packet-switched network and the POTS phone by translating digital communication into analogue communication and vice versa.

As is well appreciated in the art, the delivery technology for VoIP is fundamentally different from the delivery technology for the traditional PSTN-based calls. As a result of these differences, one area where service providers of VoIP services have encountered challenges is in the area of provisioning of emergency services. Several solutions have been proposed, including a system where a user of the VoIP endpoint is expected to register the address associated with the VoIP endpoint (a so-called "emergency address") which is stored in a memory and is retrieved when the user places an emergency call using the VoIP endpoint. The retrieved emergency address is used for two purposes: (i) to determine a Public Safety Answering Point (PSAP) that is responsible for handling calls from a particular geographic area associated with the emergency address; and (ii) transmit the emergency address to the PSAP to enable delivery of so-called "enhanced 9-1-1" services.

This solution has definite merit; however it still suffers a disadvantage associated with the fact that, due to the very nature of VoIP systems, the user can plug his or her VoIP endpoint (i.e., the VoIP phone, the ATA or the soft phone) anywhere where a high speed connection is available and place the emergency call. If the user has indeed moved his or her VoIP endpoint without updating the emergency address stored in the aforementioned memory with the new emergency address, the prior art system has no means of determining that the emergency address stored in the aforementioned memory is no longer the correct address associated with the location of the VoIP endpoint. Quite on the contrary, the aforementioned system will retrieve the stored address, determine the PSAP to route the emergency call to based on the retrieved emergency address and transmit the emergency address to the PSAP. It is clear that in this scenario, the call will most probably be routed to a wrong PSAP and the wrong emergency address information will be transmitted to the wrong PSAP. If the user of the VoIP endpoint is unable to speak (for example due to a medical condition the user is experiencing), an emergency response team will be dispatched to the wrong location, potentially resulting in a lethal outcome of the emergency situation experienced by the user.

Clearly, there is a need in the art for an improved system for verifying validity of the stored emergency address or other types of location information.

SUMMARY OF THE INVENTION

According to a first broad aspect of the present invention, there is provided a method for determining if an emergency address associated with an endpoint in a packet-switched network is valid, the emergency address having been stored in a memory. The method comprises obtaining an access device identifier associated with an access device responsible for handling a communication session between the endpoint and the packet-switched network; comparing the access device identifier with a last known access device identifier associated with the endpoint; based on the comparing, determining if the emergency address is valid.

According to a second broad aspect of the present invention, there is provided a method for enabling determining if location information associated with an endpoint in a packet-switched network is valid, the method executable at the endpoint. The method comprises determining an access device identifier associated with an access device which is to be utilized by the endpoint to establish a communication session over the packet-switched network; storing the access device identifier in a memory; releasing the access device identifier to a network entity; the releasing for enabling the network entity to compare the access device identifier with a last known access device identifier associated with the endpoint in an attempt to validate that the location information is valid.

According to a third broad aspect of the present invention, there is provided a method for enabling determining if location information associated with an endpoint in a packet-switched network is valid. The method comprises receiving from the endpoint at least an endpoint identifier and an access device identifier; determining if a record associated with the endpoint identifier exists; if the determining renders a negative outcome, creating the record associated with the endpoint, the record for storing at least the endpoint identifier and the access device identifier; wherein the record associated with the endpoint is for enabling determining if location information associated with the endpoint is valid.

According to a fourth broad aspect of the present invention, there is provided a method for determining if location information associated with an endpoint in a packet-switched network is valid, the location information having been stored in a memory. The method comprises obtaining an access device identifier associated with an access device responsible for handling a communication session between the endpoint and the packet-switched network; comparing the access device identifier with a last known access device identifier associated with the endpoint; based on the comparing, determining if the service address is valid.

According to a fifth broad aspect of the present invention, there is provided an apparatus for determining if an emergency address associated with an endpoint in a packet-switched network is valid, the emergency address having been stored in a memory. The apparatus comprises means for obtaining an access device identifier associated with an access device responsible for handling a communication session between the endpoint and the packet-switched network; means for comparing the access device identifier with a last known access device identifier associated with the endpoint; means for determining if the emergency address is valid, the means for determining being responsive to the means for comparing.

According to another broad aspect of the present invention, there is provided an apparatus for enabling determining if associated location information is valid, the apparatus connectable to an access device, the access device for enabling the apparatus to establish a communication session via a packet-switched network. The apparatus comprises means for determining an access device identifier associated with the access device; means for storing the access device identifier in a memory; means for releasing the access device identifier to a network entity; the releasing for enabling the network entity to compare the access device identifier with a last known access device identifier associated with the endpoint in an attempt to validate if the location information is valid.

According to another broad aspect of the present invention, there is provided a system for determining if an emergency address associated with an endpoint in a packet-switched network is valid, the emergency address having been stored in a memory. The system comprising: a network entity; an access device for enabling the endpoint to establish a communication session with the network entity. The network entity is operable to obtain an access device identifier associated with the access device; compare the access device identifier with a last known access device identifier associated with the endpoint; determine if the emergency address is valid.

According to yet another broad aspect of the present invention, there is provided a system for determining if an emergency address associated with an endpoint in a packet-switched network is valid, the emergency address having been stored in a memory. The system comprises a network entity that is operable to obtain an access device identifier associated with an access device responsible for handling a communication session between the endpoint and the packet-switched network; compare the access device identifier with a last known access device identifier associated with the endpoint; determine if the emergency address is valid.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIGS. 3A and 3B depict a method for verifying validity of an emergency address according to a non-limiting embodiment of the present invention;

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

Figure 1A:
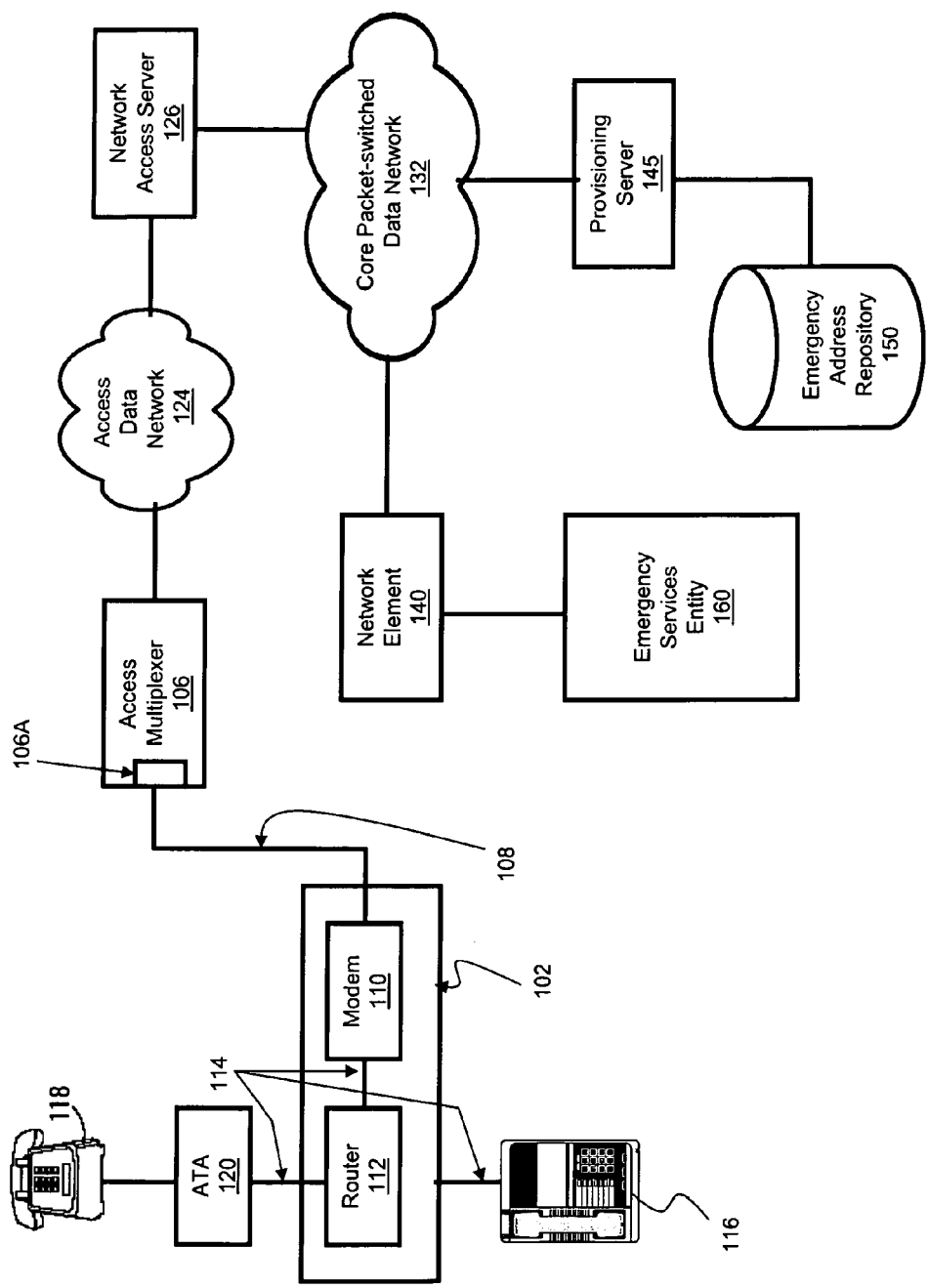
FIG. 1A is a schematic diagram representing various components of an infrastructure for verifying validity of an emergency address in a packet-switched network in accordance with a non-limiting embodiment of the present invention.

FIG. 1A shows various components of an infrastructure for verifying validity of an emergency address in a packet-switched network in accordance with a non-limiting embodiment of the present invention. The infrastructure comprises an access device 102 which is connected to an access multiplexer 106 via a physical connection link 108. In a non-limiting example, the access device 102 can comprise a modem 110 connected to a router 112 over a home network 114. The modem 110 can comprise any suitable broadband modem, such as, but not limited to, a cable modem, an xDSL modem and the like. The router 112 can be embodied in any suitable wired or wireless router. In another non-limiting embodiment, the functionality of the router 112 and the modem 110 can be embodied in a single device. In some non-limiting embodiments, the home network 114 can comprise an Ethernet network. In other non-limiting embodiments, the home network 114 can comprise a wireless network (ex. an 802.11 based network, an 802.12 based network and the like) or any other suitable type of home network.

The router 112 may in turn be connected over the home network 114 to a VoIP phone 116 or, alternatively, to a POTS phone 118 via an analog terminal adapter (ATA) 120. The ATA 120 and the VoIP phone 116 are just two non-limiting embodiments of a so-called "VoIP endpoint". Another non-limiting example of the VoIP endpoint can be embodied as a computer implementing an IP telephony software application (so-called soft client software).

In an example non-limiting embodiment, the physical communication link 108 can be a copper twisted pair, over which higher-layer protocols allow for the exchange of packets. In an alternative non-limiting embodiment, the physical communication link 108 may comprise an Ethernet link, a fiber optic link (e.g., Fiber-to-the-Home, Fiber-to-the-Curb, etc.), a wireless link (e.g., EV-DO, WiMax, WiFi, CDMA, TDMA, GSM, and the like), a cable, etc., or a combination thereof. In some non-limiting embodiments, the home network 114 can comprise an Ethernet network. In other non-limiting embodiments, the home network 114 can comprise a wireless network (ex. an 802.11 based network, an 802.12 based network, an 802.16 based network and the like) or any other suitable type of home network.

In another non-limiting embodiment, the functionality of the router 112 and the modem 110 can be embodied in a single device. In an alternative non-limiting embodiment of the present invention, the router 112 can be omitted from the infrastructure of FIG. 1. In yet further non-limiting embodiments of the present invention, the functionality of the ATA 120 can be incorporated into the modem 110. In another non-limiting embodiment of the present invention, the functionality of the ATA 120 can be incorporated into the router 112. Alternatively, in yet other non-limiting embodiments of the present invention, the functionality of the router 112, the modem 110 and the ATA 120 (or the VoIP phone 116) can be incorporated into a single device.

The access multiplexer 106, which in a non-limiting embodiment can be a digital subscriber line access multiplexer (DSLAM), is connected to a network access server (NAS) 126 via an access data network 124. In a non-limiting embodiment, the access multiplexer 106 can comprise a Stinger® FS+DSL Access Concentrator from Lucent Technologies, 600 Mountain Avenue, Murray Hill, N.J., USA. In these embodiments, the access multiplexer 106 can be located in a central office (not depicted) of a service provider. Alternatively, the access multiplexer 106 can be located at an outside location, in which case, the access multiplexer 106 can be embodied in what is referred to in the industry as an OPI-DSLAM or an outside plant interface DSLAM. In this scenario, the DSLAM 120 can comprise a Stinger® Compact Remote from Lucent Technologies. Yet in other embodiments of the present invention, the access multiplexer 106 can be distributed, with some components being situated in the central office and some components being situated at the outside location. It should be noted that in other non-limiting embodiments of the present invention, other types of access multiplexer 106 can be used. For example, in the above-mentioned cable scenario a so-called "unmanned hub" can be utilized.

The NAS 126 is sometimes also referred to by some in the industry as a broadband remote access server (BRAS), a remote access server (RAS) or a broadband access server (BAS). The NAS 126 provides access to a core packet-switched data network 132, such as the Internet, over which VoIP calls can be established. In alternative embodiments of the invention, the core packet-switched data network 132 can be implemented in any suitable data network adapted for supporting VoIP calls, such as, but not limited to, a private data network, a public data network (ex. the Internet) and the like. The type of the access data network 124 is immaterial for the purposes of the embodiments of the present invention. Generally speaking, the access data network 124 can support one or more logical links (not depicted) between the access multiplexer 106 and the NAS 126 (such as asynchronous transfer mode permanent virtual circuit (PVC), a virtual local area network (VLAN) and the like). The purpose of the access multiplexer 106 is to multiplex several physical links (such as the link 108) from several access devices (such as access device 102) for communication over the access data network 124 and vice versa.

The access multiplexer 106 can comprise a number of ports, such as a port 106A depicted in FIG. 1A. In some embodiments of the present invention, the port 106A is dedicated to the physical connection link 108. In these embodiments, each port of the access multiplexer 106 (such as the port 106A) can be associated with a dedicated logical link, for example the aforementioned PVC or VLAN, which in turn can be uniquely associated with the physical connection link 108.

In some non-limiting embodiments of the present invention, the router 112 can implement a DHCP server functionality. In other words, the router 112 can receive an IP address request from a device connected thereto (such as the ATA 120 and/or the VoIP phone 116) and, responsive to such an IP address request, to assign an IP address. In these embodiments, the router 112 can also perform network address translation functionality. Put another way, the IP address assigned by the router 112 to the devices connected thereto can be a private IP address used for addressing devices connected to the home network 114 (such as the ATA 120 and/or the VoIP phone 116) and the router 112 can perform a network address functionality by translating one or more private IP addresses into a global IP address used by the router 112 for communication with entities outside of the home network 114 via the core packet-switched network 132 and vice versa.

Figure 1B:
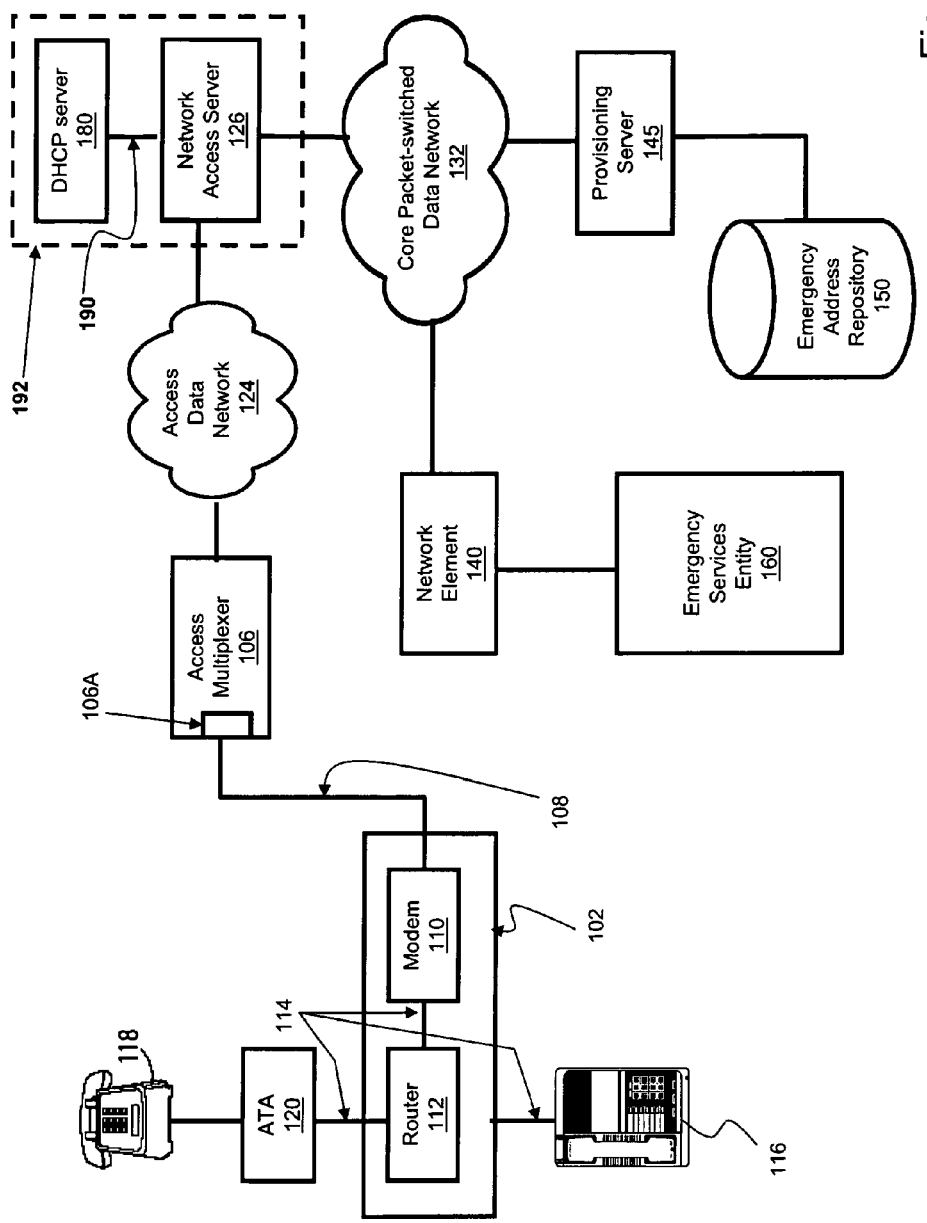
FIGS. 1B and 1C are schematic diagrams representing various components of an infrastructure for verifying validity of an emergency address in a packet-switched network in accordance with other non-limiting embodiments of the present invention.

In alternative non-limiting embodiments of the present invention, the DHCP functionality can be performed by the network access server 126. A non-limiting example of such a non-limiting embodiment is depicted in FIG. 1B, where a DHCP server 180 can be integrated with (depicted in a broken line 192) or can be accessed by the network access server 126 (depicted generally by a connection 190). In these embodiments, the router 112 can obtain an IP address by transmitting an IP address request to the DHCP server 180. How the router 112 transmits the IP address request is not particularly limiting and can include, but is not limited to, broadcasting a DHCP request, establishing a PPPoE session, establishing a PPP session, transmitting an IP address request via a logical connection (such as a VLAN, a PVC, etc.) and the like. It should be noted that in some non-limiting embodiments of the present invention, the network access server 126 can access the DHCP server 180 via a network, such as, but not limited to, the access data network 124 or the core packet-switched data network 132.

Returning to FIG. 1A and according to a specific non-limiting embodiment depicted therein, whereby the home network 114 is implemented as an Ethernet network and whereby the router 112 can implement a DHCP server functionality, the VoIP endpoint (such as the ATA 120) can maintain a mapping, which is commonly referred to by those of skill in the art as "Address Resolution Protocol" or simply as an "ARP" mapping. Specifically, the ARP mapping denotes a relationship between a destination IP Address and a destination MAC address for each potential destination device coupled to the home network 114. For example, for the purposes of communication between the ATA 120 and the router 112, the ATA 120 can maintain an ARP mapping that correlates the IP address of the router 112 (such as, but not limited to, the private IP address assigned to the router 112 for the purposes of communication over the home network 114) and the MAC address of a port of the router 112 which the ATA 120 is connected to. Naturally, other entities connected to the home network 114 (such as the VoIP phone 116, the router 112, etc.) can also maintain similar ARP mappings.

A non-limiting example of an ARP mapping that can be maintained by the ATA 120 is depicted in Table 1 below.

TABLE 1

| $1^{st}$ Destination identifier | $2^{nd}$ Destination identifier |
|---|---|
| 00-08-74-4C-7F-1D | 125.213.22.165 |
| 1256-IX1 | 25896655 |

As shown in Table 1, the ARP mapping correlates a $1^{st}$ destination identifier and a $2^{nd}$ destination identifier of a potential destination device. An example of the $1^{st}$ destination identifier is a MAC address and an example of the $2^{nd}$ network identifier is an IP address, but this not need to be construed as a limitation of the present invention. In fact, any suitable type of the $1^{st}$ and $2^{nd}$ identifiers (or just a single identifier) can be used. Returning to the two examples presented in Table 1, the ATA 120 can maintain two ARP mappings—one for the router 112 (ex. MAC address 00-08-74-4C-7F-1D and the corresponding IP address 125.213.22.165) and one for the VoIP phone 118 (ex. a proprietary identifier 1256-IX1 and the corresponding proprietary identifier 25896655).

Also provided in FIG. 1A is a network element 140, which in some embodiments of the present invention can be provided at an edge of the core packet-switched data network 132. The network element 140 is referred to in the industry as a "packet switch" or a "soft switch" and comprises circuitry, software and/or control logic for providing various communication services to VoIP endpoints (such as, for example, the ATA 120, the VoIP phone 116 or the aforementioned computer implementing an IP telephony software application). Examples of such communication services include (i) connecting incoming calls to the VoIP endpoint (such as the ATA 120, the VoIP phone 116 or the aforementioned computer implementing an IP telephony software application); and (ii) handling outgoing calls originated from the VoIP endpoint (such as the ATA 120, the VoIP phone 116 or the aforementioned computer implementing an IP telephony software application). Other examples of communication services that can be performed by the network element 140 can include but are not limited to call waiting, call forwarding, and so on.

In addition, the network element 140 can comprise suitable circuitry, software and/or control logic for exchanging calls with entities outside the core packet-switched data network 132. This is particularly convenient, when a call placed by a VoIP customer (i.e. a user of the VoIP phone 116) to a telephone number that is reachable only via the Public Switched Telephone Network (PSTN), which has been omitted from FIG. 1A for the sake of simplicity. A non-limiting example of the network element 140 can be embodied in a MCS 5200 Soft Switch manufactured by Nortel Networks Ltd. of 8200 Dixie Road, Brampton, Ontario L6T 5P6, Canada.

Given the components of the infrastructure of FIG. 1A described above, it is possible to deliver VoIP telephony services to the user of the VoIP phone 116 or the POTS phone 118 equipped with the ATA 120. The VoIP telephony service can be delivered by a service provider who manages the aforementioned access multiplexer 106, the access data network 124, the NAS 126 and the network element 140. Alternatively, the VoIP telephony service can be delivered by an alternative service provider in which case the VoIP telephony service "runs over" the infrastructure of FIG. 1. This arrangement for delivering the VoIP telephony service is generally referred to as "over-the-top VoIP".

In order to facilitate provisioning of emergency services, the infrastructure of FIG. 1A further comprises an emergency services entity 160. The emergency services entity 160 can comprise several components, such as one or more Public Safety Answering Points (PSAPs), one or more 911 selective routers, an Automatic Line Identification (ALI) database and the like. These components are well known to those of skill in the art and, as such, have been omitted from FIG. 1A. In some embodiments of the present invention, the emergency services entity 160 can be connected to the network element 140 via the PSTN (not depicted). In these embodiments, the emergency services entity 160 further comprises one or more media gateways (not depicted), the main purpose of which is to mediate digital communication to analog communication and vice versa.

Communicatively coupled to the core packet-switched data network 132 is a provisioning server 145. The function of the provisioning server 145 will be discussed in greater detail herein below. For now, suffice it to say, that the provisioning server 145 is operable to register the VoIP endpoints (i.e. the ATA 120, the VoIP phone 116 or the aforementioned computer implementing an IP telephony software application) as they are connected to the access data network 124. More specifically, the provisioning server 145 is operable to validate the VoIP endpoint, download the required software applications to the VoIP endpoint, perform service activation and the like.

The provisioning server 145 can be reached via the core packet-switched data network 132 at a network address, such as, but not limited to, an IP address. In some non-limiting embodiments, the IP address assigned to the provisioning server 145 is a static IP address. An indication of the static IP address can be hard coded into the ATA 120 and/or the VoIP phone 116. In other words, the ATA 120 and/or the VoIP phone 116 is aware of the network address at which the provisioning server 145 can be reached over the core packet-switched data network 132.

In an alternative non-limiting embodiment, the network address assigned to the provisioning server 145 can be a dynamic IP address. In these non-limiting embodiments, the ATA 120 and/or the VoIP phone 116 can be dynamically updated with the dynamic IP address of the provisioning server 145, as is known to those of skill in the art. In an alternative non-limiting embodiment of the present invention, the provisioning server 145 can be assigned a Unique Resource Identifier (URI), such as, for example, an URL. The ATA 120 and/or the VoIP phone 116 can be made aware of this URL of the provisioning server 145. The URL enables the ATA 120 and/or the VoIP phone 116 to contact the provisioning server 145 via the core packet-switched data network 132 by performing a DNS look-up, as is known to those of skill in the art.

The provisioning server 145 can implement one or more protocols for communicating with the VoIP endpoint (such as the ATA 120 and/or the VoIP phone 116 and/or the aforementioned computer implementing an IP telephony software application). In some non-limiting embodiments of the present invention, the provisioning server 145 can implement an XML over HTTPS protocol. In alternative non-limiting embodiments of the present invention, a Session Initiation Protocol or, simply, a SIP protocol can be used. In yet other embodiments, which are particularly true where the VoIP endpoint is embodied in a computing apparatus operable to execute a soft client application, Simple Object Access Protocol (SOAP) can be used. In yet further embodiments of the present invention, an Extensible Mark-up Language (XML) Configuration Access Protocol (XCAP), available from http://www.ietf.org/internet-drafts/draft-ietf-simple-xcap-11.txt, can be used. It should be noted that in alternative non-limiting embodiments, any other suitable protocol can be used.

In some embodiments of the present invention, the network element 140 and the provisioning server 145 can implement a Simple Object Access Protocol (SOAP) protocol. As such, the network element 140 and the provisioning server 145 can exchange messages using SOAP protocol via the core packet-switched data network 132. Any other suitable communication protocol can be used for the purposes of communication between the network element 140 and the provisioning server 145.

Figure 2:
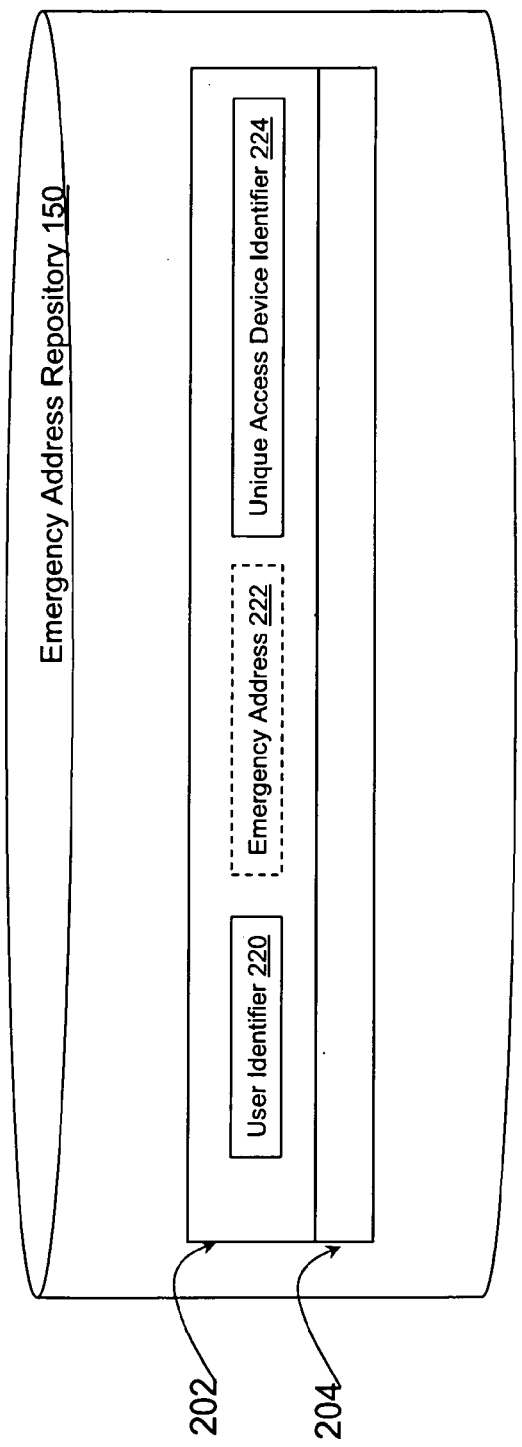
FIG. 2 is a schematic diagram depicting an emergency address repository of FIGS. 1, 1A and 1B according to a non-limiting embodiment of the present invention.

Communicatively coupled to the provisioning server 145 is an emergency address repository 150. Generally speaking, the purpose of the emergency address repository 150 is to maintain a mapping between a network identifier of the VoIP endpoint and a network identifier associated with an access device (such as, but not limited to, the access device 102 or a portion thereof, the access multiplexer 106, etc.). The emergency address repository 150 will now be described in greater detail with reference to FIG. 2, which depicts a specific non-limiting embodiment of such an emergency address repository 150.

The emergency address repository 150 can maintain a number of records, such as an example record 202. For the purposes of the specific non-limiting example discussed herein below, assume that the record 202 is associated with the user of the ATA 120. The record 202 can comprise several fields, such as a user identifier 220 and a unique access device identifier 224. The purpose of the user identifier 220 is to identify a particular user or a VoIP endpoint associated with the particular user whom the record 202 is associated with. A user identifier 220 can be embodied in a network identifier of the VoIP endpoint (such as a directory number, a SIP address, a MAC address and the like), a customer account number or any other suitable identifier.

The method for determining and populating the unique access device identifier 224 will be described in greater detail herein below. For the time being, suffice it to say that the purpose of the unique access device identifier 224 is to uniquely identify an access device employed by the VoIP endpoint (such as the POTS phone 118 equipped with the ATA 120, the VoIP phone 116 or the aforementioned computer implementing an IP telephony software application) to establish a communication session via the network element 140 and the core packet-switched data network 132. The term "access device", as used herein below, can encompass the access device 102 in its entirety, the router 112 or the modem 110. It is also envisioned that the term "access device" can encompass the access multiplexer 106 or even the NAS 126.

In some non-limiting embodiments of the present invention, the emergency address repository 150 can also comprise an emergency address 222. The emergency address 222 comprises an indication of the physical location of the VoIP endpoint, such as a civic address, a set of geo-coordinates and the like. In a first non-limiting embodiment, data maintained in the emergency address 222 can be provided by the user of the VoIP endpoint. Method for populating such data is described in the US patent application assigned to the applicant entitled "PROVISIONING OF EMERGENCY SERVICES IN A VOICE-OVER-PACKET ENVIRONMENT", bearing an application Ser. No. 10/986,395 filed on Nov. 12, 2004, the content of which is incorporated herein by reference in its entirety. In a second non-limiting embodiment, the emergency address 222 can be populated by an auto-discovery procedure, the method of implementing which is described in the US patent application assigned to the applicant entitled "METHOD FOR POPULATING A LOCATION INFORMATION DATABASE USED IN THE DELIVERY OF EMERGENCY AND OTHER LOCATION-BASED SERVICES IN A VOIP ENVIRONMENT", bearing an application number 11/378,413, filed on Mar. 30, 2006, the content of which is incorporated herein by reference in its entirety. It should be explicitly noted that the alternative method for populating the emergency address 222 are within the scope of the embodiments of this invention.

It should be noted that an indication of the emergency address can be maintained elsewhere in the infrastructure of FIG. 1A. For example, in some non-limiting embodiments of the present invention, the indication of the emergency address can be maintained by the network element 140 in an internal database (not depicted). In another non-limiting embodiment of the present invention, the indication of the emergency address can be maintained in a database (not depicted) accessible by the network element 140 via the core packet-switched data network 132. In yet further non-limiting embodiments, the indication of the emergency address can be maintained by the VoIP endpoint. Yet in further non-limiting embodiments, the indication of the emergency address can be maintained in a Location Information Database (not depicted), as promulgated in a document by NENA 08-001, Issue 1, Dec. 6, 2005, entitled "*Interim VoIP Architecture for Enhanced 9-1-1 Services (i2)*". Other alternatives for maintaining the indication of the emergency address are, of course, possible and are within the scope of embodiments of the present invention.

Naturally, the emergency address repository 150 can maintain a number of other records, collectively depicted at 204. These records 204 can be associated with other subscribers to the VoIP telephony service.

Figure 1C:
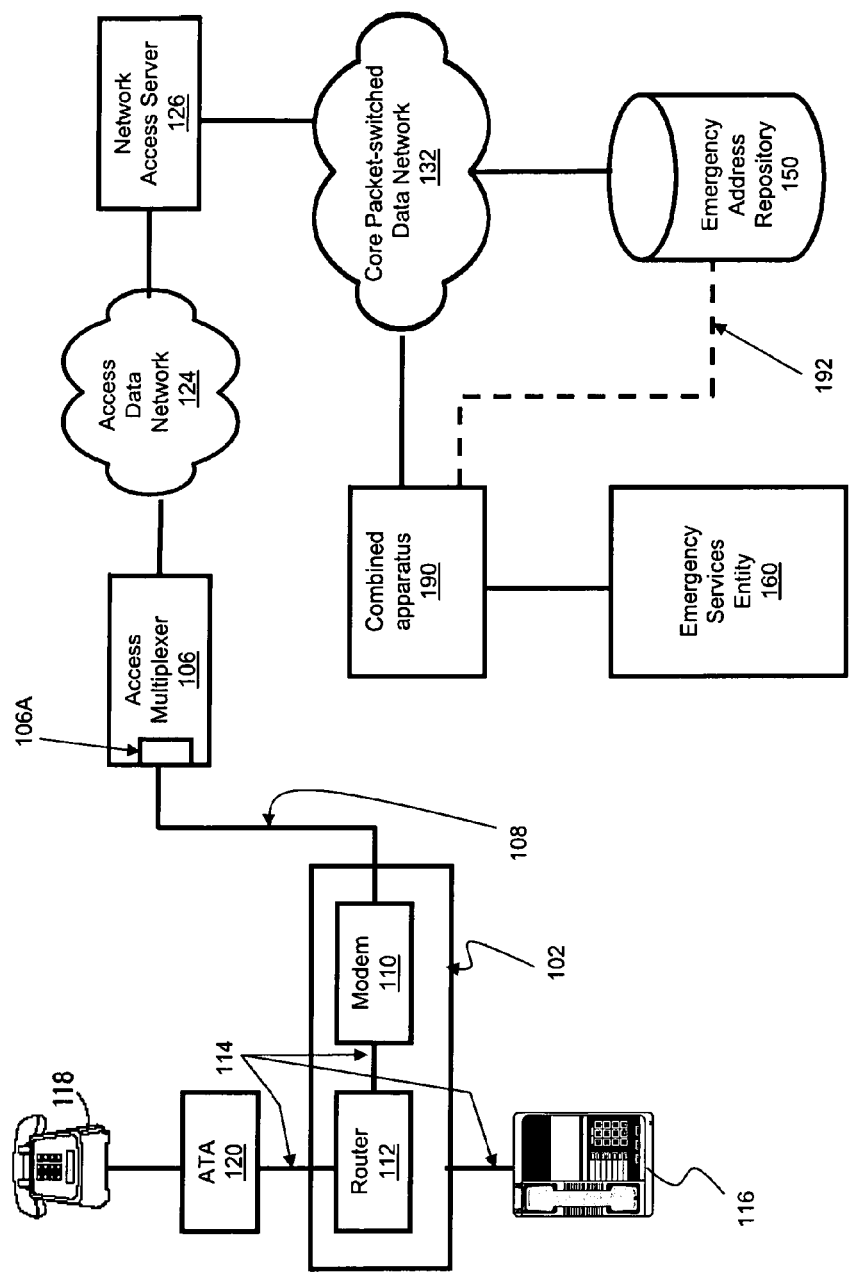

It should be noted that in some non-limiting embodiments of the present invention, the functionality of the provisioning server 145 and the network element 140 can be integrated into a single device, as depicted in FIG. 1C. In a non-limiting embodiment depicted in FIG. 1C, the functionality of the provisioning server 145 and the network element 140 is embodied in a combined apparatus 190. The combined apparatus 190 can access the emergency address repository 150 via the core packet-switched data network 132. In an alternative non-limiting embodiment of the invention, the emergency address repository 150 can be connected directly to the combined apparatus 190 via a direct link (depicted as 192). In another non-limiting embodiment of the present invention, the emergency address repository 150 can be integrated into the functionality of the combined apparatus 190.

Of course, it will be apparent to those skilled in the art that numerous modifications and variations of the infrastructure of FIGS. 1A, 1B and 1C are possible. For example, in an alternative non-limiting embodiment, the access multiplexer 106 can be omitted. This is especially true in the case where the access device 102 implements a wireless access point. In an example non-limiting embodiment of this scenario, the connection between the wireless access point and the NAS 126 can be provided by a dedicated point-to-point link. In another non-limiting scenario where the modem 110 implements a cable modem, the access multiplexer 106 can also be omitted. Yet in another non-limiting embodiment, the NAS 126 can be omitted from the infrastructure of FIG. 1.

Figure 3B:
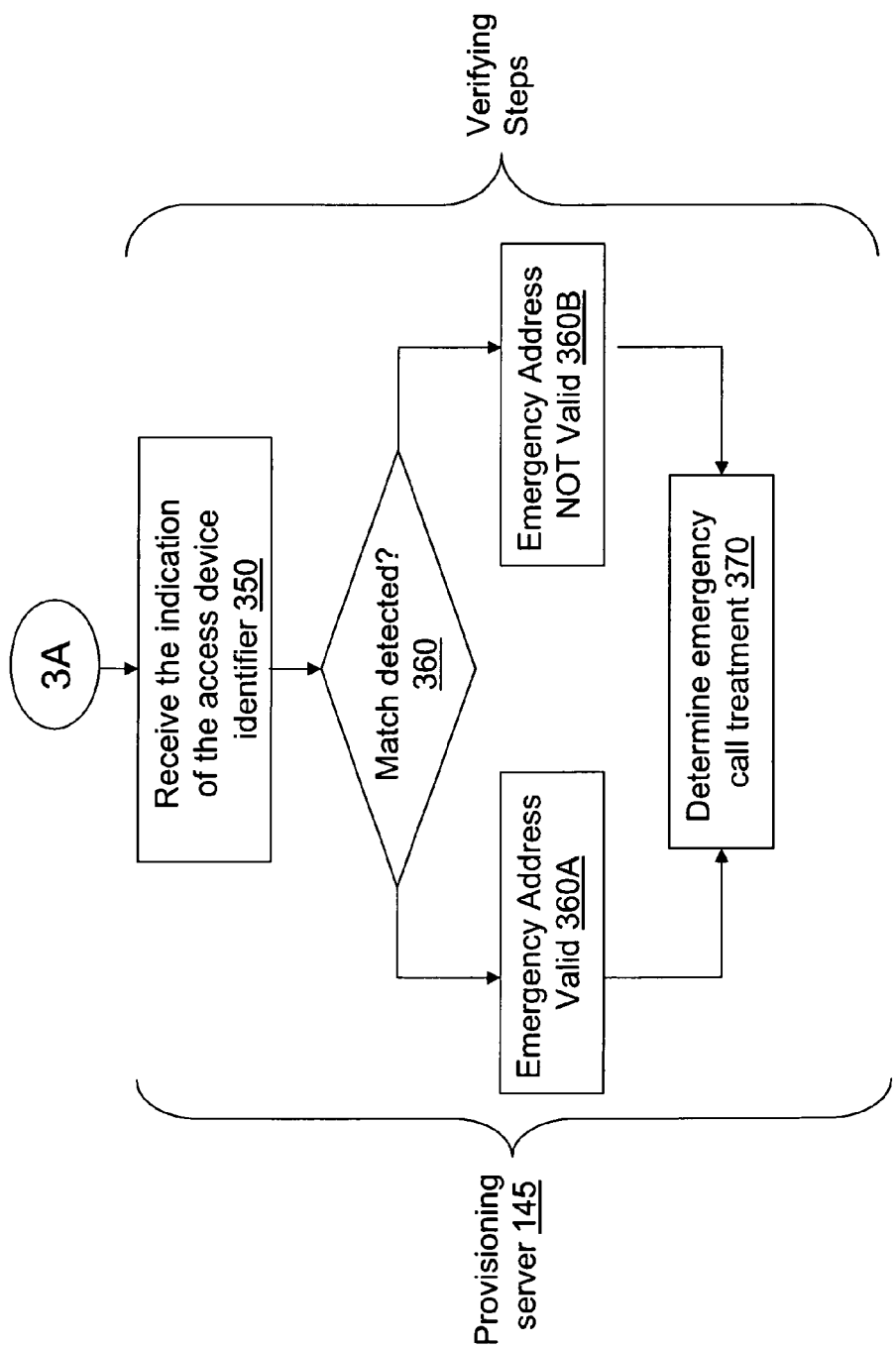

Given the infrastructure of FIG. 1A, 1B or 1C, it is possible to perform a method for determining validity of the emergency address according to an embodiment of the present invention. With reference to FIGS. 3A and 3B a method for enabling determination of validity of the emergency address is now described.

Step 310: VoIP Endpoint Obtains an Indication of an Access Device Identifier

The method begins at step 310 at which an indication of an access device identifier is obtained. In a non-limiting embodiment of the present invention, step 310 can be executed when the VoIP endpoint is powered on. In alternative embodiments, step 310 can be executed upon occurrence of a particular event, such as the user of the ATA 120 attempting to place a call, the user of the ATA 120 attempting to place an emergency call, the ATA 120 broadcasting an IP address request and the like. For the purposes of the illustrative non-limiting example presented herein below, it is assumed that the VoIP endpoint comprises the ATA 120.

Several non-limiting alternative embodiments of how the ATA 120 can obtain the indication of the access device identifier are possible:

Scenario 1—FIG. 1A

When the ATA 120 is powered on (for example when the user of the ATA 120 plugs in the ATA 120 for the first time), the ATA 120 attempts to obtain an IP address. In a non-limiting example of the architecture depicted in FIG. 1A, the ATA 120 can broadcast an IP address request to the router 112 via the home network 114. For example, the ATA 120 can broadcast an Ethernet frame containing the IP address request.

It will be recalled that in some non-limiting embodiments of the present invention, the router 112 can perform a DHCP server functionality. In these non-limiting embodiments, responsive to the receipt of the IP address request, the router 112 assigns an IP address in a manner known to those of skill in the art and generates an Ethernet frame containing the IP address assigned to the ATA 120. The router 112 then transmits the Ethernet frame to the ATA 120.

When the ATA 120 receives the Ethernet frame, the ATA 120 can examine a header of the Ethernet frame in order to determine (i) an IP address associated with a source of the Ethernet frame (i.e. the router 112); and (ii) a MAC address associated with the source of the Ethernet frame (i.e. a port of the router 112 to which the ATA 120 is connected to). Equipped with this information, the ATA 120 populates the aforementioned ARP mapping.

Effectively, the ATA 120 has obtained the indication of the access device identifier associated with the access device (i.e. the router 112).

Scenario 2—FIGS. 1A/1B/1C—An Alternative Implementation

In an alternative non-limiting scenario, which is particularly applicable in embodiments whereby the ATA 120 is assigned a static IP address, the ATA 120 can obtain the indication of the access device identifier in the following manner.

When powered on, the ATA 120 can send a ping to the provisioning server 145 (or any other suitable network entity coupled to the core packet-switched network 132) via the router 112 and via the core packet-switched network 132. Responsive to receipt of the ping, the provisioning server 145 can send an IP packet containing a ping response to the ATA 120. When the router 112 receives the IP packet containing the ping response destined for the ATA 120, it encapsulates the received IP packet in a format suitable for transmission over the home network 114. In specific non-limiting examples of the infrastructures of FIGS. 1A/1B/1C, the router 112 can encapsulate the received IP packet into an Ethernet frame and transmit the Ethernet frame to the ATA 120. When the ATA 120 receives the Ethernet frame, it becomes aware of the IP address and the MAC address associated with the router 112 in substantially the same way as described above in reference to Scenario 1. The ATA 112 then populates the aforementioned ARP mapping.

Effectively, the ATA 120 has obtained the indication of the access device identifier associated with the access device (i.e. the router 112).

Persons skilled in the art will appreciate that the above-described scenarios are intended to serve as examples and are not intended to be limiting in any way. Other variations for the ATA 120 to obtain the indication of the access device identifier are possible and are within the scope of the embodiments of this invention.

Step 320: Provisioning Server 145 Receives the Indication of the Access Device Identifier At step 320, the provisioning server 145 receives the indication of the access device identifier from the ATA 120. Specifically, the ATA 120 establishes a communication session with the provisioning server 145 via the core packet-switched data network 132 and transmits the indication of the access device identifier thereto. The ATA 120 also transmits an indication of an identifier associated with the ATA 120, such as, but not limited to, a telephone number, a SIP address, a MAC address and the like. The indication of the identifier associated with the ATA 120 is hereinafter referred to as a "VoIP endpoint identifier".

Generally speaking, the ATA 120 creates a delivery component that contains the indication of the access device identifier and the VoIP endpoint identifier, the delivery component being compatible with the protocols associated with the communication session established between the ATA 120 and the provisioning server 145. More specifically, it will be recalled that in some non-limiting embodiments, the ATA 120 and the provisioning server 145 can implement the XML over HTTPS protocol. In these specific non-limiting embodiments, the ATA 120 can transmit the indication of the access device identifier and the VoIP endpoint identifier to the provisioning server 145 using one or more optional fields of the XML schema. In a non-limiting example, the indication of the access device identifier and the indication of the VoIP endpoint identifier can be captured in the optional field of the XML schema as follows:

<AccessDeviceIdentifier><01-08-22-5L-8T-6M>
<EndpointIdentifier><00-08-74-4C-7F-1D >

Those skilled in the art will appreciate that other protocols for transmitting the indication of the access device identifier and the VoIP endpoint identifier can be used for the purposes of the embodiments of the present invention.

Alternative Implementations

This alternative non-limiting embodiment of how the provisioning server 145 can become aware of the access device identifier is particularly applicable in embodiments whereby the provisioning server 145 has access to the access data network 124 and, more particularly, to the logical links (ex. PVC or VLAN) defined therethrough. In this non-limiting scenario, the provisioning server 145 can obtain the indication of the access device identifier not from the ATA 120, but rather from the access device itself, which in this scenario can comprise the access multiplexer 106. More specifically, the provisioning server 145 can request from the access multiplexer 105 an indication of a VLAN or the PVC assigned to a physical connection link (such as the aforementioned physical connection link 108) associated with the ATA 120 or, in other words, an identifier of a logical link associated with the port 106A which serves the ATA 120.

In these alternative non-limiting embodiments, the step 310 described above can be omitted. It should be noted that in these alternative non-limiting embodiments, execution of step 320 can be triggered, for example, by the ATA 120 being plugged in for the first time. One skilled in the art will appreciate that any other suitable trigger described above can also be used to trigger the execution of step 320.

In an alternative non-limiting embodiment of the present invention, the router 112 can transmit the indication of the access device identifier to the provisioning server 145. In these non-limiting embodiments, the access device identifier can be embodied in one of: an identifier of the router 112, an identifier of the modem 110 and the like. Yet in another non-limiting embodiment of the present invention, the NAS 126 can transmit the indication of the access device identifier to the provisioning server 145. For example, when generating and transmitting the IP address to the ATA 120, the NAS 126 can transmit an indication of the access device identifier (which in this scenario can be, but is not limited to, an identifier of the port 106A or the access multiplexer 106) to the provisioning server 145.

Step 330: Provisioning Server 145 Stores the Indication of the Access Device Identifier Next, the provisioning server 145 stores the indication of the access device identifier. In some non-limiting embodiments of the present invention, execution of step 330 can be triggered by a so-called previous record discovery routine. To that extent, the provisioning server 145 attempts to locate a record associated with the user of the ATA 120. Specifically, the provisioning server 145 retrieves the VoIP endpoint identifier associated with the ATA 120 (such as, but not limited to, a telephone number, a SIP address, a MAC address and the like) received in step 320 and attempts to locate a record which contains a user identifier 220 that matches the VoIP endpoint identifier associated with the ATA 120.

If the provisioning server 145 fails to locate the record, the provisioning server 145 realizes that no record associated with the ATA 120 has been provisioned and, thus, the provisioning server 145 deduces that the ATA 120 is powered on for the first time.

Having determined that no record associated with the ATA 120 exists, the provisioning server 145 generates the aforementioned record 202. Firstly, the provisioning server 145 populates the user identifier 220. In a specific non-limiting example, the provisioning server 145 retrieves the VoIP endpoint identifier (such as, but not limited to, a telephone number, a SIP address, a MAC address and the like associated with the ATA 120) and generates the user identifier 220 based on the retrieved VoIP endpoint identifier. Next, the provisioning server 145 retrieves the indication of the access device identifier and populates the unique access device identifier 224.

Effectively, the provisioning server 145 generated a record that correlates the user identifier (ex. the network identifier of the ATA 120) with the access device identifier (ex. a MAC address of the port of the router 112).

Given steps 310 to 330, which can be jointly described as provisioning steps, the provisioning server 145 has generated knowledge of a unique access device identifier associated with an access point used by the user of the ATA 120 at a particular location. Put another way, the provisioning server 145 has obtained a unique access device identifier associated with the particular location or what is to be referred to herein below as a "last known access device identifier". Given the knowledge of the last known access identifier, it is possible to validate whether the emergency address is valid.

Step 350: Provisioning Server 145 Receives an Indication of an Access Device Identifier At this step, the indication of the access device identifier is received at the provisioning server 145. In some non-limiting embodiments of the present invention, step 350 can be performed upon occurrence of a triggering event. In some non-limiting embodiments of the present invention, the triggering event can be manifested in the ATA 120 broadcasting an IP address request. For example, the ATA 120 can broadcast the IP address request after being powered on after a power loss or pursuant to an ATA 120 re-set procedure that requires to power off and then to power on the ATA 120. Alternatively, the ATA 120 can broadcast the IP address request after the user has unplugged the ATA 120 and plugged it in again into the same or a different power outlet (which can be at the same or at a different location). Alternatively, the ATA 120 can broadcast the IP address request when being plugged into a new access device, for example being plugged into another modem, such as a modem in a hotel room or the like.

In an alternative embodiment of the present invention, the triggering event can be manifested in the ATA 120 being powered on. This is particularly true in embodiments, when the ATA 120 is assigned a static IP address. As will be appreciated by those of skill in the art, in these non-limiting embodiments, the ATA 120 does not transmit an IP address request. Therefore, step 350 can be executed upon the VoIP endpoint being powered on.

In another non-limiting embodiment of the present invention, which are particularly true where the VoIP endpoint is embodied in a computing apparatus running a soft client application, the triggering event can comprise the user logging in to the soft client application.

In yet another non-limiting embodiment of the present invention, the triggering event can comprise an occurrence of a particular time. In other words, step 350 can be executed on a periodic basis, such as, but not limited to, every hour, every day, monthly or at any other suitable time interval.

In yet further non-limiting embodiments of the present invention, the triggering event can further be manifested in the user of the ATA 120 indicating his or her desire to initiate an outgoing call, for example, by dialing a destination directory number. In some embodiments of the present invention, the method is only responsive to a particular type of the outgoing call, such as, but not limited to, an emergency call. In other non-limiting embodiments, the method is responsive to any types of the requests for establishment of a communication session. In yet further non-limiting embodiments of the present invention, the triggering event can comprise a first outgoing call of the day and the like.

Irrespective of how execution of step 350 is triggered, in some non-limiting embodiments of the present invention, the ATA 120 can transmit the indication of the access device identifier to the provisioning server 145. Specifically, the ATA 120 can transmit the indication of the access device identifier stored in the ARP mapping and the VoIP endpoint identifier in substantially the same way as described above in reference to step 310.

In alternative non-limiting embodiments of the present invention, the provisioning server 145 can request the access device (which in this non-limiting scenario can be embodied in the aforementioned access multiplexer 106) to transmit the indication of the access device identifier (which in this non-limiting scenario can be embodied in a MAC address of the aforementioned port 106a; a logical link identifier associated with the logical link defined for the physical connection 108 or even an identifier of the physical connection 108 itself, if one is available).

Yet in an alternative embodiment of the present invention, the provisioning server 145 can receive the indication of the access device identifier from the NAS 126. Specifically, the NAS 126 can transmit the indication of the access device identifier to the provisioning server 145 when assigning an IP address to the router 112 (or if no router 112 is present, to the ATA 120 or the VoIP phone 116). In these non-limiting embodiments, the access device identifier can comprise an identifier of the port 106A or the access multiplexer 106, an identifier of the router 114, an identifier of the modem 110 or the access device 102.

Step 360: Compare the Received Access Device Identifier with the Last Known Access Device Identifier Next, the received access device identifier is compared with the last known access device identifier stored in the emergency address repository 150 in a record associated with the user of the ATA 120. To that extent, the provisioning server 145 attempts to locate a record associated with the user of the ATA 120.

Specifically, the provisioning server 145 retrieves the VoIP endpoint identifier associated with the ATA 120 (such as, but not limited to, a telephone number, a SIP address, a MAC address and the like) received in step 350 and attempts to locate a record which contains a user identifier 220 that matches the VoIP endpoint identifier associated with the ATA 120. If the provisioning server 145 fails to locate the record, the provisioning server 145 can execute an exception handling routine, such as, but not limited to, determining that the emergency address is not available or is not valid, generating a default emergency call treatment trigger (such as basic 911 emergency call treatment trigger) and the like. The purpose of the basic 911 emergency call treatment trigger will be explained in greater detail herein below.

For the purposes of the non-limiting example being described herein below, it will be assumed that the provisioning server 145 has successfully located the record associated with the ATA 120 (i.e. the aforementioned record 202). Once the provisioning server 145 is successful in locating the record (in the non-limiting example discussed herein, record 202), the provisioning server 145 retrieves the unique access device identifier 224, which contains the indication of the last known access device identifier.

The provisioning server 145 then compares the access device identifier received in step 350 with the last known access device identifier maintained in the unique access device identifier 224. If the two values match (i.e. the "Yes" branch of step 360), the provisioning server 145 determines that the ATA 120 accesses the core packet-switched data network 132 through the same access device as the access device associated with the last known access device identifier. In other words, the provisioning server 145 determines that the user of the ATA 120 has not moved and, thus, determines that the emergency address (for example, the emergency address 222) is valid 360A.

If, on the other hand, the two values do not match (i.e. the "No" branch of step 360), the provisioning server 145 determines that the ATA 120 accesses the core packet-switched data network 132 through an access device different from the access device associated with the last known access device identifier. In other words, the provisioning server 145 determines that the user of the ATA 120 has moved and, thus, determines that the emergency address is not valid 360B.

Step 370: Determine Emergency Call Treatment

Equipped with the determination whether the emergency address is valid 360A or the emergency address is not valid 360B, the provisioning server 145 determines emergency call treatment at step 370.

Emergency Address is Valid 360A

If it has been determined that the emergency address is valid 360A, the provisioning server 145 can create a so-called "enhanced 911 call treatment trigger". The enhanced 911 call treatment trigger is indicative of the fact that the emergency address associated with the last known location (for example, the aforementioned emergency address 222 or an emergency address maintained at a different entity) is valid and, therefore, the emergency address can be used for determining emergency call routing and/or for forwarding to the PSAP to enable the PSAP to dispatch an emergency response unit to the emergency address. The enhanced 911 call treatment trigger can be then transmitted to the VoIP endpoint or to the network element 140.

In an alternative non-limiting embodiment of the present invention, the record 202 may contain a routing key to be used for routing the emergency call. In these non-limiting embodiments of the present invention, if it is determined that the emergency address is valid 360A, the routing key maintained in the record 202 can be retrieved and the emergency call can be handled in accordance with the routing key. Methods for using such a routing key are described in the US patent application assigned to the applicant entitled "EMERGENCY CALL HANDLING IN A VOICE-OVER-PACKET ENVIRONMENT", bearing an application Ser. No. 10/986,365 filed on Nov. 12, 2004, the content of which is incorporated herein by reference in its entirety.

Emergency Address is not Valid 360B

If it has been determined that the emergency address is not valid 360B, the provisioning server 145 can create a so-called "basic 911 call treatment trigger". The basic 911 call treatment trigger is indicative of the fact that the emergency address associated with the last known location (for example, the aforementioned emergency address 222 or an emergency address maintained in a different entity) is not valid and, therefore, the emergency address should not be used for determining emergency call routing and/or for forwarding to the PSAP. Put another way, any emergency call originated by the user of the ATA 120 should be subjected to the basic 911 call treatment, such as forwarding to a central answering point and the like. The basic 911 call treatment trigger can be then transmitted to the ATA 120 or to the network element 140.

In some non-limiting embodiments of the present invention, the provisioning server 145 can trigger an update routine. The update routine is to enable updating the information maintained in the emergency address 222. In case that the emergency address 222 is updated by the user of the ATA 120, the provisioning server 145 can convey a reminder to the user of the ATA 120, for example by calling the user of the ATA 120, sending an e-mail reminder, sending an SMS reminder, sending a reminder by mail and the like. In some non-limiting embodiments of the present invention, the user of the ATA 120 can log into a web portal (not depicted) and, once properly authenticated, can indicate that he or she has moved. The user can be authenticated by providing an account number, a SIP address, a MAC address of the VoIP endpoint or any other suitable identifier. The web portal can then trigger a record update routine and, particularly, the web portal can transmit a message to the provisioning server 145 to trigger the provisioning server to delete a record associated with the ATA 120 (i.e. the aforementioned record 202). The user can then perform a powering cycle, i.e. power off and power on the ATA 120. By performing the power cycle, the user triggers execution of the aforementioned steps 310-330 which results in an updated record associated with the ATA 120 with updated access device identifier being stored emergency address repository 510. It should be noted that any other triggering event described above can be used to trigger the creation of the updated record associated with the ATA 120.

In case that the emergency address 222 is updated by an auto-discover routine, the provisioning server 145 can trigger such an auto-discovery routine.

Given steps 350 to 370, which can be jointly described as verification steps, the provisioning server 145 has verified validity of the emergency address associated with the VoIP endpoint and determined the emergency call treatment based on whether the emergency address is valid or not.

Figure 3C:
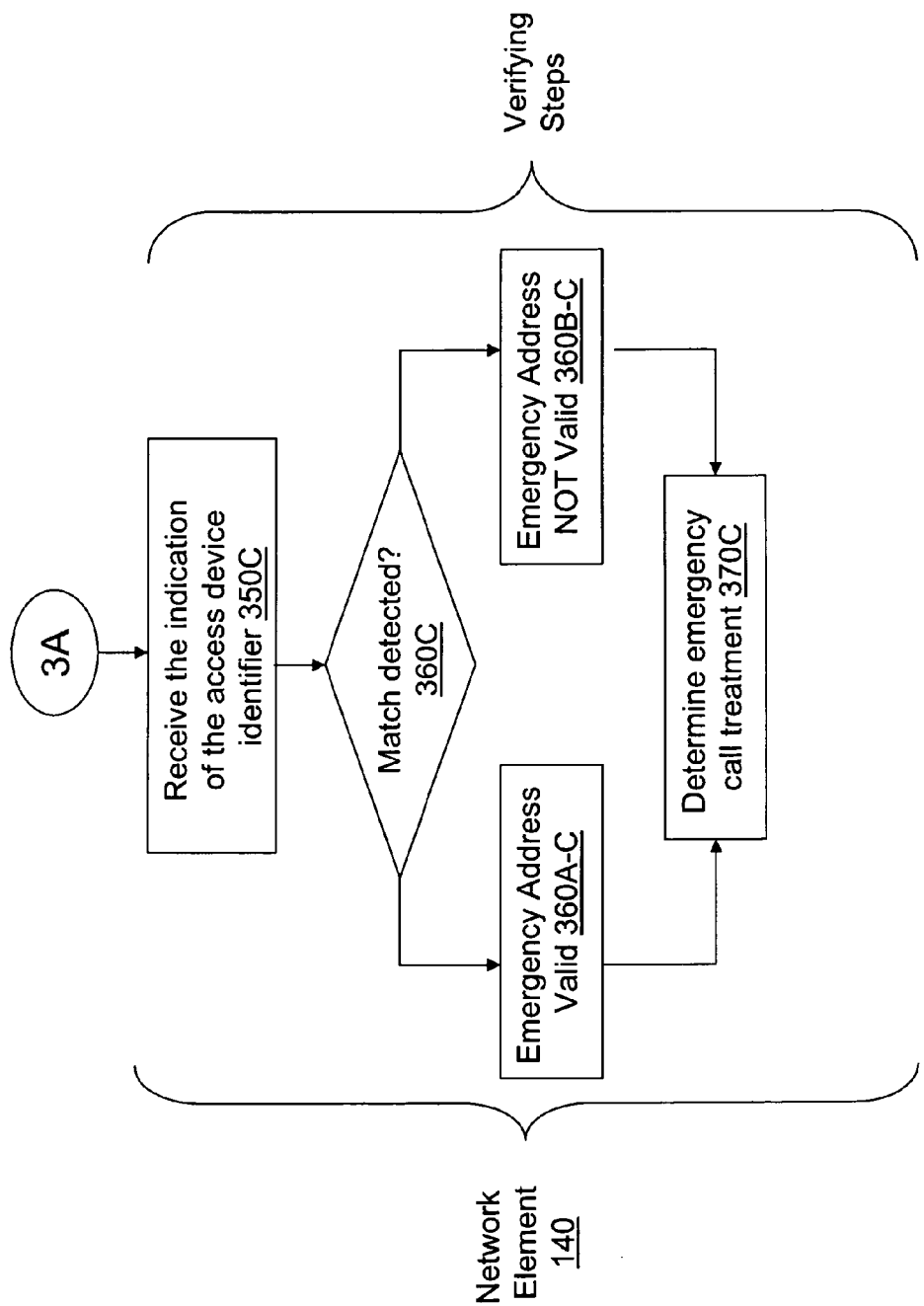
FIG. 3C depicts a method for verifying validity of an emergency address according to another non-limiting embodiment of the present invention.

In an alternative non-limiting embodiment of the above-described method, as depicted in FIG. 3C, verifying steps 350C-370C can be executed by the network element 140. Execution of these steps by the network element 140 is substantially similar to the execution of steps 350-370 by the provisioning server 145, as described above. Specific non-limiting differences are discussed below.

Step 350C

Step 350C can be triggered and performed in substantially the same way as described above in relation to step 350. For example, the triggering event in these non-limiting embodiments can be manifested in the user of the ATA 120 indicating his or her desire to initiate an outgoing call, for example, by dialing a destination directory number. In some embodiments of the present invention, the method is only responsive to a particular type of the outgoing call, such as, but not limited to, an emergency call. In other non-limiting embodiments, the method is responsive to any types of the requests for establishment of a communication session. It should be noted that various alternatives for the triggering event contemplated above in respect to step 350 are also applicable to implementation of step 350C.

Step 360C

In order to execute this step, the network element 140 can contact the aforementioned emergency address repository 150 (whether directly, as is the case in the infrastructure depicted in FIG. 1C or via the provisioning server 145 using SOAP or any other suitable protocol, as is the case in the infrastructures depicted in FIGS. 1A and 1B) to locate and retrieve the content of the record 202.

It will be recalled that in some non-limiting embodiments of the present invention, the functionality of the network element 140, the provisioning server 145 and the emergency address database 150 can be integrated into a single device (i.e. the aforementioned combined apparatus 190). In these non-limiting embodiments, the network element 140 can execute a database look-up into the local emergency address repository 150.

Step 370C

Once the network element 140 determines whether the enhanced 911 call treatment trigger or the basic 911 call treatment trigger should apply, the network element 140 can either:
  (i) immediately act on the trigger (especially in scenario, whereby the verifying steps are triggered by the user of the ATA 120 placing an emergency call);
  (ii) store the appropriate trigger in a database (not depicted);
  (iii) transmit the appropriate trigger to the ATA 120;
  (iv) transmit the appropriate trigger to the provisioning server 145.

Yet in other non-limiting embodiments, the execution of steps 350-370 or 350C-370C can be split between various entities of the infrastructure of FIGS. 1, 1A and 1B. For example, step 350C can be implemented by the network element 140, while steps 360C-370C can be performed by the provisioning server 145.

Even though the above description has primarily been based on examples of verifying validity of an emergency address for the purposes of delivering emergency response services, it should be noted that the teachings presented herein can be equally used for verifying validity of a service address for the purposes of delivering other types of location-based services, such as non-emergency location based services.

Consider now a customer services call being originated from the user of the ATA 120. When the customer services call is received at the network element 140, the network element can execute the above-described verification steps in order to determine if the service address associated with the user of the ATA 120 is valid or, in other words, determine if the user of the ATA 120 has moved his or her ATA 120.

If the network element 140 determines that the service address is valid or, in other words, that the user of the ATA has not moved, the network element 140 can trigger execution of one or more of the following actions:
  a) determine special offers (such as, but not limited to, discounts, promotions, etc.) currently available in the geographic area associated with the stored service address;
  b) automatically determine language preferences (e.g., French for calls originated from locations in the province of Quebec, Spanish for calls originated from locations in a certain neighborhood or country, etc.);
  c) perform a network test, if other users in the same geographic area have experienced or reported issues with network connectivity.

If the network element 140 determines that the service address is no longer valid or, in other words, that the user of the ATA 120 has moved, the network element 140 can transmit an indication of the user of the ATA 120 having moved to a customer services representative, who can take one or more of the following actions:

a) solicit from the user of the ATA 120 the new service address and update the service address;

b) update the user of the ATA 120 on the special offers available in the new geographic area associated with the updated service address;

c) perform network tests on the connection or review other settings or potential problems specific to the new geographical area.

Even though the foregoing description has used an example of a VoIP endpoint for illustration purposes, it should be understood that it was not intended to be limiting in any sense. Generally speaking, the teachings of the embodiments of the present invention can be applied for verifying validity of location information for the purposes of delivering SIP-based services (such as voice calls over packet-switched networks, instant messaging and the like) or location information for the purposes of services delivered to endpoints in a packet-switched network in general.

Those skilled in the art will appreciate that certain functionality of the NAS 126, emergency address repository 150 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the NAS 126, emergency address repository 150 and/or other elements may be implemented as an arithmetic and logic unit (ALU) having access to a code memory (not shown) which stores program instructions for the operation of the ALU. The program instructions could be stored on a medium which is fixed, tangible and readable directly by the NAS 126, emergency address repository 150 and/or other elements, (e.g., removable diskette, CD-ROM, ROM, fixed disk, USB drive), or the program instructions could be stored remotely but transmittable to the NAS 126, the emergency address repository 150 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for determining if location information associated with an endpoint in a packet-switched network is valid, said location information having been stored in a memory, the method comprising:

obtaining an access device identifier associated with an access device responsible for handling a communication session between said endpoint and said packet-switched network, said access device being a network entity distinct from said endpoint;

comparing said access device identifier with a last known access device identifier associated with said endpoint;

based on said comparing, determining if said location information is valid.

2. The method defined in claim 1, wherein said location information comprises an emergency address.

3. The method defined in claim 2, wherein said obtaining an access device identifier is executed upon an occurrence of receiving a request for establishment over said packet-switched network of a communication session with said endpoint.

4. The method defined in claim 2, wherein said obtaining an access device identifier is executed upon an occurrence of receiving an indication of said endpoint requesting a network address.

5. The method defined in claim 2, wherein said obtaining an access device identifier is executed upon an occurrence of at least one of detecting that said endpoint has been powered on and determining that said endpoint has initiated execution of a soft client application.

6. The method defined in claim 2, wherein said obtaining an access device identifier is executed upon an occurrence of a particular time.

7. The method as defined in claim 2, further comprising initiating an emergency address update function if said comparing renders a negative outcome.

8. The method as defined in claim 2 further comprising generating an enhanced emergency call treatment trigger if said emergency address is valid, wherein said enhanced emergency call treatment trigger is instrumental in causing, when an emergency call is originated from said endpoint, execution of at least one of:

using said emergency address for determining an emergency call route to an emergency answering point;

transmitting said emergency address to said emergency answering point for enabling dispatching an emergency response unit to said emergency address.

9. The method defined in claim 2 further comprising generating an enhanced emergency call treatment trigger if said emergency address is valid, wherein said enhanced emergency call treatment trigger is instrumental in causing, when an emergency call is originated from said endpoint, execution of:

using a routing key associated with said emergency address for routing the emergency call.

10. The method as defined in claim 2 further comprising generating a basic emergency call treatment trigger if said emergency address is not valid, wherein said basic emergency call treatment trigger is instrumental in causing, when an emergency call is originated from said endpoint, execution of:

routing said emergency call to a central emergency answering point for enabling said central emergency answering point to determine a current emergency address.

11. The method as defined in claim 2, wherein said obtaining comprises acquiring said access device identifier from said access device.

12. The method as defined in claim 11, wherein said acquiring said access device identifier from said access device comprises requesting said access device to transmit an indication of a logical link identifier associated with said endpoint and receiving said indication of a logical link identifier.

13. The method as defined in claim 12, wherein said indication of a logical link identifier comprises one of a PVC identifier and a VLAN identifier.

14. The method as defined in claim 11, wherein said acquiring said access device identifier from said access device comprises requesting said access device to transmit an indication of a physical connection identifier associated with a physical connection serving said endpoint.

15. The method as defined in claim 11, wherein said acquiring said access device identifier from said access device comprises requesting said access device to transmit an indication of a port identifier associated with a port serving said endpoint.

16. The method as defined in claim 2, wherein said obtaining comprises acquiring said access device identifier from a network access server.

17. The method as defined in claim 16, wherein said access device identifier comprises a logical link identifier.

18. The method as defined in claim 17, wherein said logical link identifier comprises one of a PVC identifier and a VLAN identifier.

19. The method as defined in claim 1, wherein said access device comprises a router and said access device identifier comprises a MAC address of a port of said router to which said endpoint is connected.

20. The method as defined in claim 1, wherein said access device comprises an access multiplexer and said access device identifier comprises a MAC address of a port of said access multiplexer associated with said endpoint.

21. The method as defined in claim 1, wherein said access device comprises an access multiplexer and said access device identifier comprises an identifier of a physical connection serving said endpoint.

22. The method as defined in claim 1, wherein said access device comprises an access multiplexer and said access device identifier comprises a logical link identifier associated with a logical link defined for a physical connection serving said endpoint.

23. An apparatus for determining if location information associated with an endpoint in a packet-switched network is valid, said location information having been stored in a memory, the apparatus comprising:
  means for obtaining an access device identifier associated with an access device responsible for handling a communication session between said endpoint and said packet-switched network, said access device being a network entity distinct from said endpoint;
  means for comparing said access device identifier with a last known access device identifier associated with said endpoint;
  means for determining if said location information is valid in response to said means for comparing.

24. A system for determining if location information associated with an endpoint in a packet-switched network is valid, said location information having been stored in a memory, the system comprising:
  a network entity; and
  a storage medium coupled to the network entity storing codes that when executed by the network entity to:
    obtain an access device identifier associated with an access device responsible for handling a communication session between said endpoint and said packet-switched network, said access device being a network entity distinct from said endpoint;
    compare said access device identifier with a last known access device identifier associated with said endpoint;
    determine if said location information is valid based on the comparison.

25. The system as defined in claim 24 further comprising said access device, wherein said access device comprises a router and said access device identifier comprises a MAC address of a port of said router to which said endpoint is connected.

26. The system as defined in claim 24 further comprising said access device, wherein said access device comprises an access multiplexer and said access device identifier comprises a MAC address of a port of said access multiplexer associated with said endpoint.

27. The system as defined in claim 24 further comprising said access device, wherein said access device comprises an access multiplexer and said access device identifier comprises an identifier of a physical connection serving said endpoint.

28. The system as defined in claim 24 further comprising said access device, wherein said access device comprises an access multiplexer and said access device identifier comprises a logical link identifier associated with a logical link defined for a physical connection serving said endpoint.

\* \* \* \* \*